Patented Oct. 14, 1930

1,778,147

UNITED STATES PATENT OFFICE

EARL S. EDWARDS, OF PENNINGTON, NEW JERSEY, ASSIGNOR TO PANELYTE CORPORATION, OF TRENTON, NEW JERSEY, A CORPORATION OF NEW JERSEY

MANUFACTURE OF FIBER BOARD

No Drawing.  Application filed May 16, 1929. Serial No. 363,723.

My invention relates to the manufacture of material, usually pressed in the form of boards, especially designed for electric insulation and made of wood pulp, or other strong fibrous material having felting power in conjunction with other substances, such as gilsonite or other material of an organic asphaltic or bituminous nature, to act as a binder and otherwise, red gum or another gum or resin to impart rigidity to the gilsonite, coloring material, such as a black dye, and a fireproofing material.

My invention has for its special object to make a material of this general character which is peculiarly fire resistant, and at the same time strongly resistant to electricity, moisture, and heat; can be cut, sawed, drilled, or otherwise worked like maple wood for example; is strong and resistant to tensile, a compression and bending strains, and to shrinking and warping; does not absorb moisture and is not affected by climatic changes, acids, oil, or water; is of light weight and inexpensive to manufacture.

To these and other ends, in the present practice of my invention, I prefer to make my improved fabric board of the following ingredients, or their equivalents, combined substantially as and in about the proportions specified, some of the ingredients specified, however, not being essential, and their proportions and the specific process variable within the boundaries of the claims as hereinafter defined:

Preferred ingredients

|   | Pounds |
|---|---|
| Bone dry kraft (sulphate) wood pulp | 1000 |
| Gilsonite | 860 |
| Red gum | 640 |
| Pontamine black (dye) E | 50 |
| Sodium tetraborate (borax) | 1250 or less |
| Calcium chloride | 500 |

Preferred process

The wood pulp is shredded in any ordinary shredder and placed in an ordinary beater with enough water at ordinary temperature to circulate and beaten for about two hours more or less.

The gilsonite, preferably Cuban, is ground with about five (5) parts more or less of water in an ordinary pebble mill for about two (2) hours, more or less, until it forms a thin paste, and is then placed in the beater with the wood pulp.

The red gum is ground in a pebble mill for about one (1) hour and then placed in the beater with the wood pulp and gilsonite.

The black dye (pontamine black E) is then added to the batch in the beater.

The sodium tetraborate (borax) is dissolved by agitation in hot water, at about 180° F., and the solution added to the batch in the beater.

The calcium chloride, previously dissolved in about two (2) parts by weight of water is then added to the batch.

When the calcium chloride is added to the batch, it forms, with the sodium tetraborate, calcium borate.

The reaction is as follows:

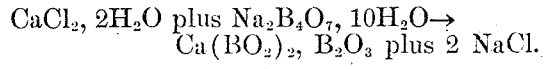

Due to the manner in which the borax ionizes in solution

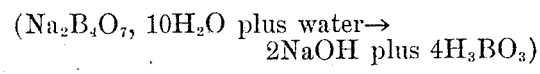

the calcium borate precipitated in the beater is in the form of $Ca(BO_2)_2$; one molecule of $B_2O_3$ (boric acid anhydride) splits off and forms free boric acid, which remains in solution.

The remaining product of the reaction between the calcium chloride ($CaCl_2$) and the borax $Na_2B_4O_7 \cdot 10H_2O$ is sodium chloride (NaCl) which remains in solution and is lost in the drainage water when the pulp is pressed and dried.

After agitation of the batch in the beater, it is dumped into a tank, then pumped up into a box at a higher level, whence it flows through a trough over an electric magnet to retain any stray metallic particles. The mixture then is pumped or passed into a clean chest in which enough water is added to make the pulp density about ten (10) to twenty (20) grains per cubic inch.

The mixture is then pumped into hoppers where it circulates back into the clean chest so as to make the mixture uniform.

The mixture is then pressed in an ordinary wet machine into sheets of the required thickness and the sheets dried in the ordinary way, to be cut up for marketing.

Instead of the kraft pulp or in part combination therewith may be used asbestos, cotton flock or any other suitable fibrous material of requisite strength and felting power.

Instead of or in part combination with the gilsonite may be used any other suitable fusible material of an organic asphaltic or bituminous nature which has a melting point of about 350° F., for example Congo (copal) gum.

Instead of or in part combination with the red gum may be used any suitable gum or resin which flows like gilsonite, will coat the fibers and will give a certain rigidity to the product.

The gilsonite acts as a waterproofing and insulating agent and also as a coloring material.

The red gum acts as an insulating agent and to give the gilsonite a certain rigidity which is required.

The calcium borate finally imparts the valuable fire-resisting quality.

The greater part of the free $B_2O_3$ like the sodium chloride is lost.

Instead of the sodium tetraborate may be used any other suitable water-soluble borate.

Instead of the calcium chloride may be used any other suitable water-soluble salt of calcium.

Instead of the black dye, any other suitable coloring material may, of course, be used.

The red gum or resin is imported mostly from Australia, and in this market is known as "grass tree gum". The red and yellow gums are derived from a species of Xanthorrhœa, especially *Xanthorrhea Australlis*, and *Xanthorrhea hastilis*. The red gum occurs as small red-brown dusty lumps with a lustrous structure.

The finished product has all the valuable qualities already mentioned in the preliminary statement of this invention.

I claim as my invention:

1. The method of making a fiber board, which consists in beating a felting fibrous material, a fusible material of an organic asphaltic nature, a water-soluble salt of calcium, and a water-soluble borate in water, and then pressing and drying the mixture.

2. The method of making a fiber board, which consists in beating wood pulp, gilsonite, calcium chloride, sodium tetraborate in water, and pressing and drying the mixture.

3. The method of making a fiber board, which consists in beating wood pulp, gilsonite, red gum, calcium chloride, sodium tetraborate in water, and pressing and drying the mixture.

4. The method of making a fiber board, which consists in beating wood pulp, gilsonite, red gum, calcium chloride, dye, and sodium tetraborate in water, and then pressing and drying the mixture.

5. The method of making a fiber board, which consists in beating kraft pulp, a fusible material of an organic asphaltic nature, a water-soluble salt of calcium, a water-soluble borate in water, and then pressing and drying the mixture.

6. The method of making a fiber board, which consists in beating a felting fibrous material, gilsonite, a water-soluble salt of calcium, a water-soluble borate in water, and then pressing and drying the mixture.

7. The method of making a fiber board, which consists of beating a felting fibrous material, a fusible material of organic asphaltic nature, a water-soluble salt of calcium, a water-soluble borate in water, adding a gum, and then pressing and drying the mixture.

8. The method of making a fiber board, which consists in beating a felting fibrous material, a fusible material of organic asphaltic nature, calcium chloride, a water-soluble borate in water, and then pressing and drying the mixture.

9. The method of making a fiber board, which consists in beating a felting fibrous material, a fusible material of organic asphaltic nature, a water-soluble salt of calcium, sodium tetraborate in water, and then pressing and drying the mixture.

10. A fiber board consisting of a pressed and dried mixture of a felting fibrous material, a fusible material of an organic asphaltic nature, and calcium borate.

11. A fiber board consisting of a pressed and dried mixture of a felting fibrous material, a fusible material of an organic asphaltic nature, calcium borate, and gum or resin.

12. A fiber board consisting of a pressed and dried mixture of felting fibrous material, a fusible material of an organic asphaltic nature, calcium borate, red gum, and dye.

13. A fiber board consisting of a pressed and dried mixture of wood pulp, a fusible material of an organic asphaltic nature and calcium borate.

14. A fiber board consisting of a pressed and dried mixture of felting fibrous material, a fusible material of organic asphaltic nature, a water-soluble salt of calcium, and a water-soluble borate.

15. A fiber board consisting of a pressed and dried mixture of felting fibrous material, gilsonite, and calcium borate.

16. A fiber board consisting of a pressed and dried mixture of kraft pulp, gilsonite, red gum, dye, borax, and calcium chloride.

In testimony whereof I affix my signature.

EARL S. EDWARDS.